(12) United States Patent
Cheemalapati et al.

(10) Patent No.: US 9,942,089 B2
(45) Date of Patent: *Apr. 10, 2018

(54) NETWORK RESOURCES MANAGEMENT BY A CLOUD CONSUMER

(71) Applicant: International Business Machines Corporation, Armonk, NY (US)

(72) Inventors: Srinivas Cheemalapati, Morrisville, NC (US); Clinton Douglas, Charlotte, NC (US); Rebecca E. Lutz, Orlando, FL (US); Todd D. Robinson, Frederick, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/219,479

(22) Filed: Jul. 26, 2016

(65) Prior Publication Data
US 2016/0337170 A1    Nov. 17, 2016

Related U.S. Application Data

(63) Continuation of application No. 14/516,640, filed on Oct. 17, 2014, now Pat. No. 9,461,934.

(51) Int. Cl.
*G06F 15/173* (2006.01)
*H04L 12/24* (2006.01)
(Continued)

(52) U.S. Cl.
CPC ...... *H04L 41/0686* (2013.01); *G06F 9/45558* (2013.01); *H04L 41/0213* (2013.01);
(Continued)

(58) Field of Classification Search
CPC . H04L 41/0686; H04L 41/0213; H04L 43/18; H04L 47/70; H04L 67/10; G06F 2009/45595; G06F 9/45558
See application file for complete search history.

(56) References Cited

U.S. PATENT DOCUMENTS

| 6,104,868 | A | * | 8/2000 | Peters | H04L 41/022 709/202 |
| 6,192,034 | B1 | * | 2/2001 | Hsieh | H04L 41/0206 370/241 |

(Continued)

OTHER PUBLICATIONS

U.S. Appl. No. 14/516,640, filed Oct. 17, 2014, now U.S. Pat. No. 9,461,934.

(Continued)

*Primary Examiner* — Mohamed A Wasel
(74) *Attorney, Agent, or Firm* — John R. Pivnichny; Law Office of Jim Boice

(57) ABSTRACT

A method, hardware device, and/or computer program product manages network resources. A cloud service provider hypervisor server that supports a cloud service provider hypervisor receives a cloud consumer's management information base (MIB) via an application program interface. The cloud consumer's MIB is a portable MIB that is capable of being loaded into multiple cloud service provider hypervisors. A trap receiver in the cloud service provider hypervisor server receives a Simple Network Management Protocol (SNMP) trap from a resource described by the cloud consumer's MIB. The SNMP trap is an SNMP message that describes an event in the resource. The cloud service provider hypervisor server transfers the SNMP trap to a cloud consumer without any interpretation of the SNMP trap by the cloud service provider hypervisor.

20 Claims, 5 Drawing Sheets

(51) Int. Cl.
  *H04L 12/911* (2013.01)
  *G06F 9/455* (2018.01)
  *H04L 12/26* (2006.01)
  *H04L 12/927* (2013.01)
  *H04L 29/08* (2006.01)

(52) U.S. Cl.
  CPC .............. *H04L 43/18* (2013.01); *H04L 47/70* (2013.01); *H04L 47/80* (2013.01); *H04L 67/10* (2013.01); *G06F 2009/45595* (2013.01)

(56) References Cited

U.S. PATENT DOCUMENTS

| | | | | |
|---|---|---|---|---|
| 6,539,027 | B1* | 3/2003 | Cambron | H04J 3/04 370/400 |
| 6,697,845 | B1* | 2/2004 | Andrews | H04L 41/0213 709/208 |
| 7,451,199 | B2* | 11/2008 | Kandefer | H04L 41/00 709/217 |
| 8,504,688 | B2 | 8/2013 | Kullos | |
| 2005/0108375 | A1* | 5/2005 | Hallak-Stamler | G06F 3/0605 709/223 |
| 2009/0327799 | A1* | 12/2009 | Yazawa | G06F 11/2033 714/4.1 |
| 2010/0046531 | A1* | 2/2010 | Louati | H04L 41/0806 370/401 |
| 2014/0047099 | A1 | 2/2014 | Flores et al. | |
| 2014/0075005 | A1 | 3/2014 | Tung et al. | |
| 2014/0075021 | A1* | 3/2014 | Revanuru | H04L 43/04 709/224 |
| 2014/0129691 | A1 | 5/2014 | Samovskiy et al. | |
| 2015/0180920 | A1* | 6/2015 | Hunter | H04L 67/025 709/203 |
| 2016/0127454 | A1* | 5/2016 | Maheshwari | H04L 47/70 709/223 |
| 2016/0285957 | A1* | 9/2016 | Haserodt | H04L 67/1097 |

OTHER PUBLICATIONS

P. Mell et al., "The NIST Definition of Cloud Computing", National Institute of Standards and Technology, Information Technology Laboratory, Sep. 2011, pp. 1-7.

List of IBM Patents or Patent Applications Treated as Related, Oct. 5, 2016, pp. 1-2.

* cited by examiner

NETWORK RESOURCES MANAGEMENT BY A CLOUD CONSUMER

BACKGROUND

The present disclosure relates to the field of cloud systems, and more specifically to the field of managing resources on cloud systems. Still more specifically, the present disclosure relates to enabling a cloud consumer to manage resources on a cloud system.

A cloud is a collection of resources that are remotely accessible by a customer and/or consumer. A cloud allows a customer/consumer to access resources such as hardware devices and software programs on an as-needed basis, rather than having to own such resources outright.

SUMMARY

A method, hardware device, and/or computer program product manages network resources. A cloud service provider hypervisor server that supports a cloud service provider hypervisor receives a cloud consumer's management information base (MIB) via an application program interface. The cloud consumer's MIB is a portable MIB that is capable of being loaded into multiple cloud service provider hypervisors. A trap receiver in the cloud service provider hypervisor server receives a Simple Network Management Protocol (SNMP) trap from a resource described by the cloud consumer's MIB. The SNMP trap is an SNMP message that describes an event in the resource. The cloud service provider hypervisor server transfers the SNMP trap to a cloud consumer without any interpretation of the SNMP trap by the cloud service provider hypervisor.

DETAILED DESCRIPTION

Figure 1:
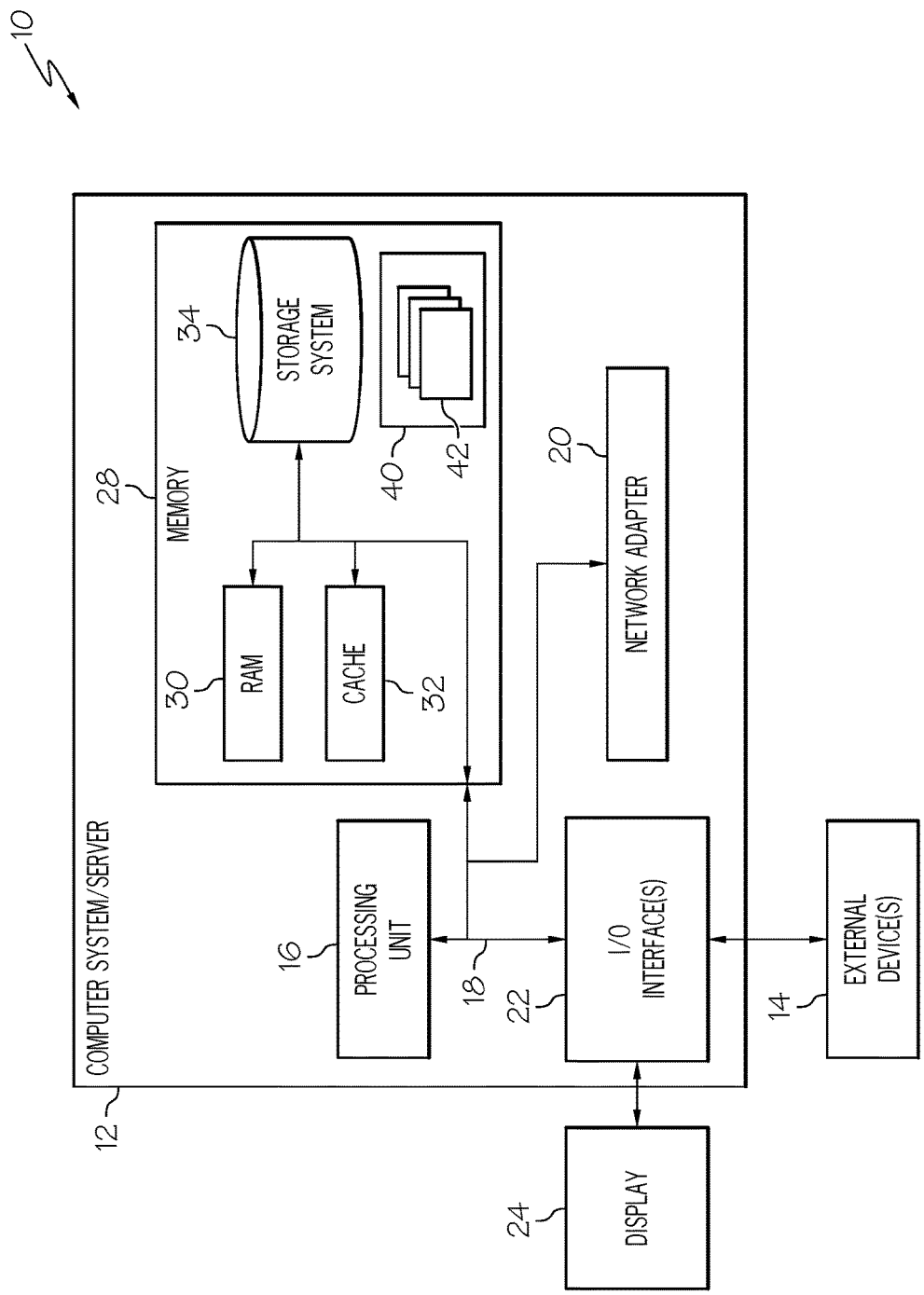
FIG. 1 depicts a cloud computing node according to an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one embodiment, it is to be understood that in one or more embodiments, the present invention is capable of being implemented in a cloud computing environment.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In one or more embodiments of the present invention, external devices 14 utilize the architecture of the computer system/server 12 shown in FIG. 1. Similarly, the architecture of computer system/server 10 can be implemented in the cloud service provider hypervisor server 408 shown in FIG. 4.

Figure 2:
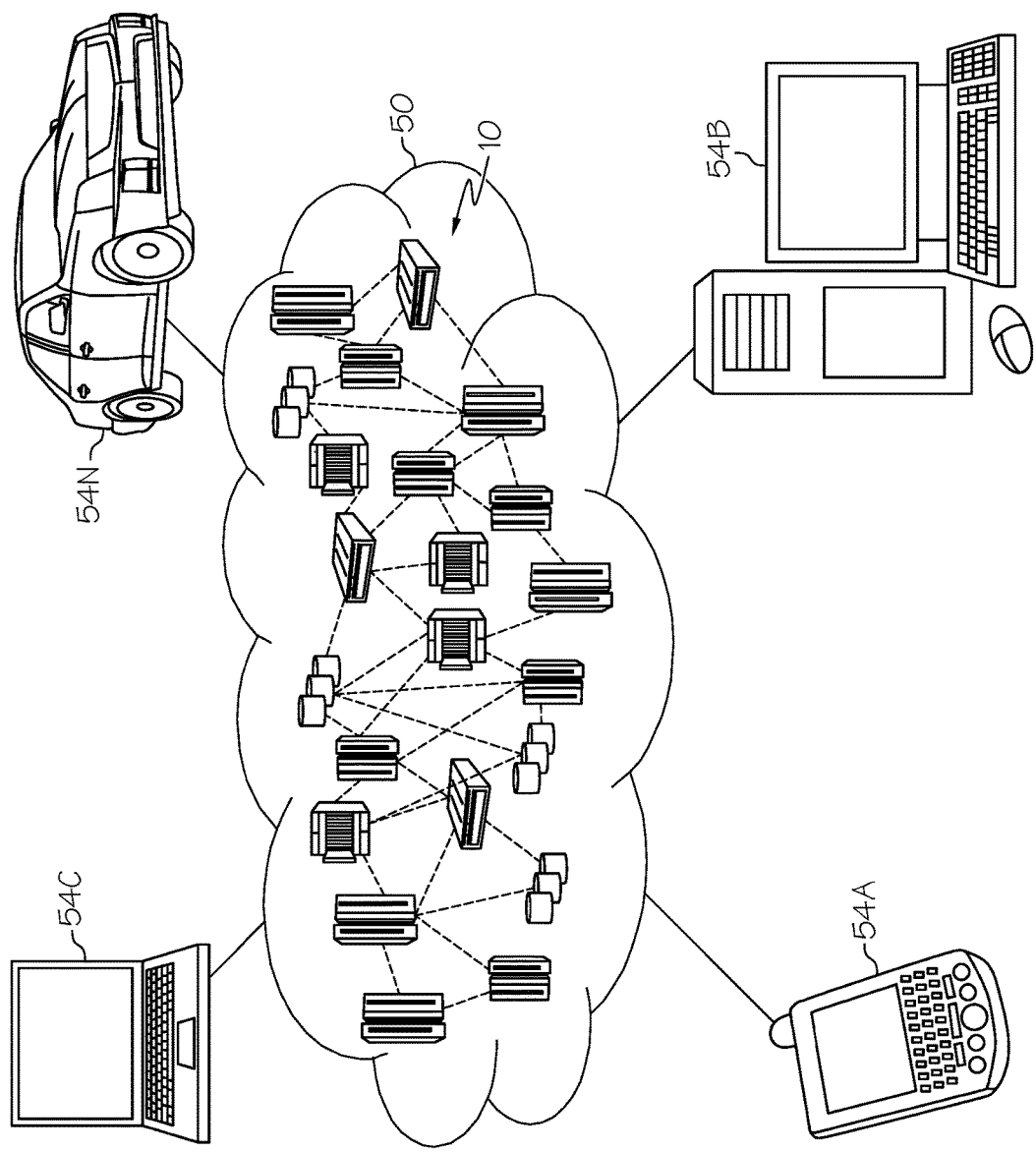
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 4:
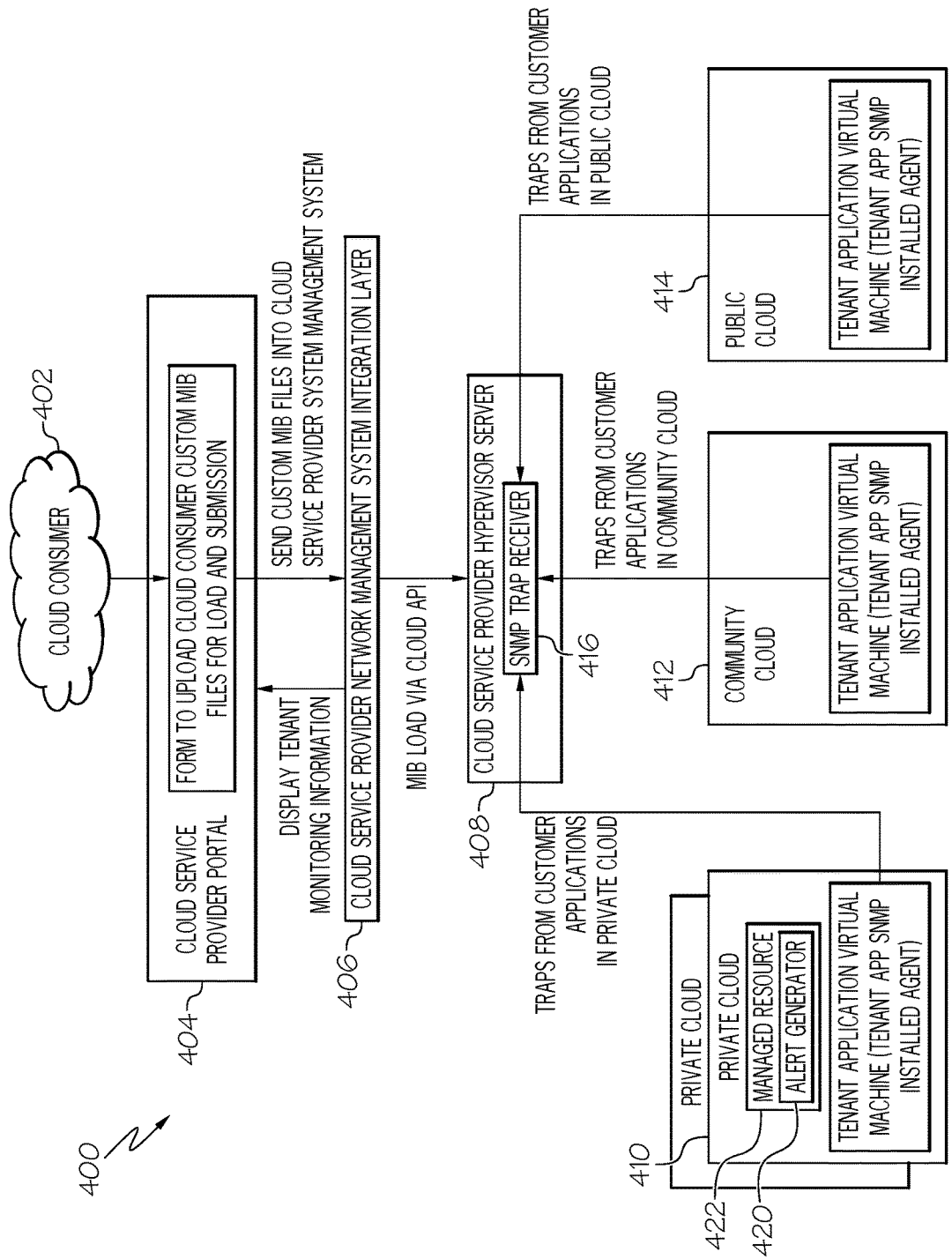
FIG. 4 illustrates an exemplary system in which the present invention may be utilized.

In an embodiment of the present invention, the infrastructure of the cloud computing environment 50 is used by cloud consumer 402 shown in FIG. 4.

Figure 3:
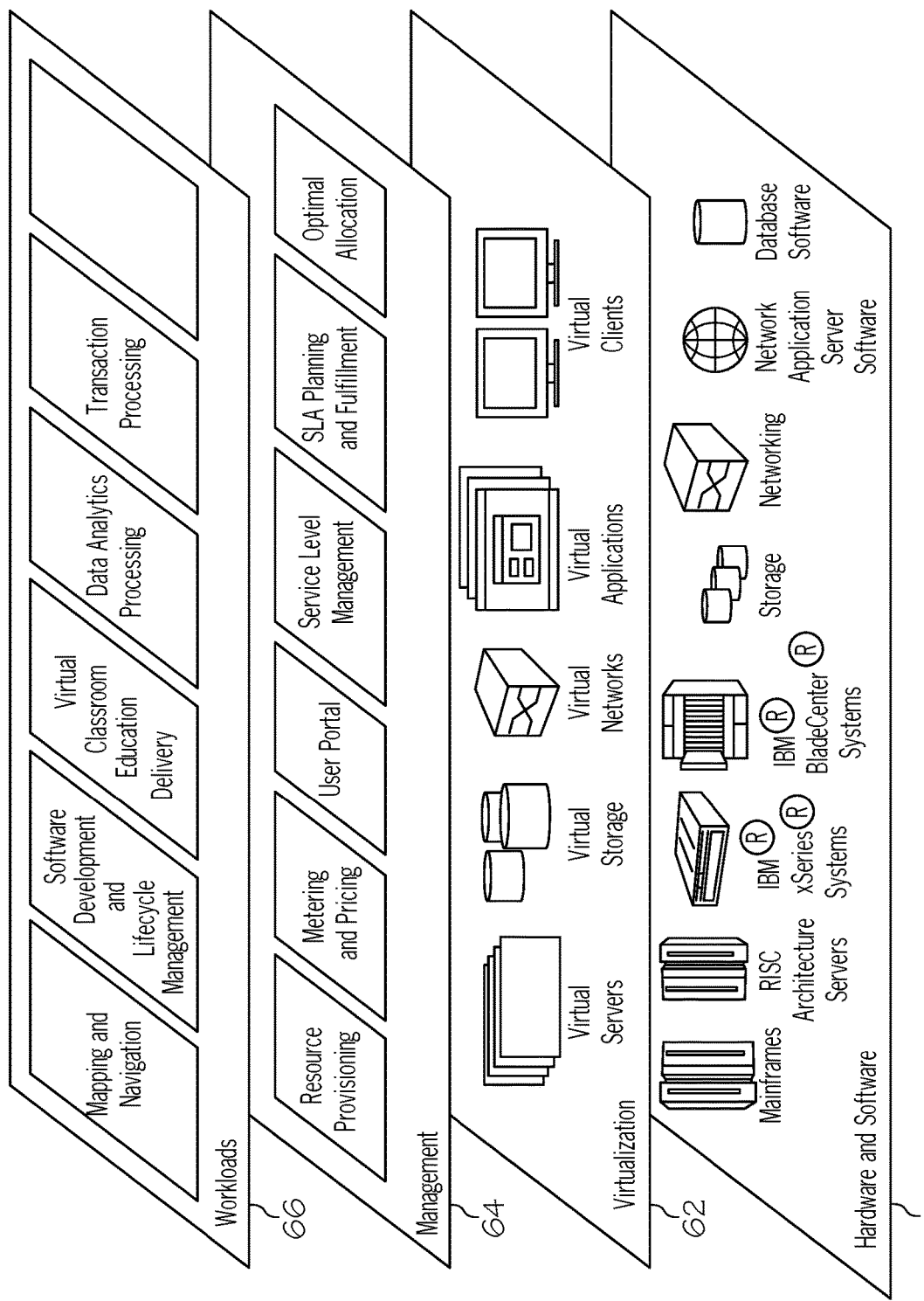
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and cloud resources management, as described herein, and as represented by the "Cloud Resources Managing" found in workloads layer 66.

With reference now to FIG. 4, an exemplary cloud system 400 and high level flowchart of actions performed in accordance with one or more embodiments of the present invention is presented.

A cloud consumer 402 is a collection of cloud-based resources (i.e., one or more hardware devices such as computers, storage devices, etc.) that are utilized by a cloud customer (i.e., a person). In an embodiment of the present invention, cloud system 400 includes multiple clouds, including the depicted private cloud 410, the community cloud 412, and the public cloud 414. Private cloud 410, community cloud 412, and public cloud 414 are all clouds, meaning that they supply and/or utilize the resources and/or provide the services and/or utilize the architecture described above. As such, each of the private cloud 410, community cloud 412, and public cloud 414 contain resources (including hardware such as servers and/or software such as applications) that have an associated SNMP agent, which sends a message (called an "SNMP trap") whenever an event occurs with the associated resource (also known as a "managed device" in the SNMP architecture). As described herein in one or more embodiments of the present invention, messages are sent and managed in accordance with an uploaded cloud consumer specific MIB file. SNMP traps are sent to a cloud hypervisor, such as the cloud service provider hypervisor found in a cloud service provider hypervisor server 408, also known as a network management station (NMS). The cloud hypervisor, also called a "cloud manager", executes applications, which monitor and control the managed devices in the cloud system 400, on the cloud service provider hypervisor server 408. Although only a single NMS (i.e., cloud service provider hypervisor server 408) is depicted in FIG. 4, multiple NMSs may exist in the cloud system 400.

As depicted in FIG. 4, a cloud service provider portal 404 allows the cloud consumer 402 (and thus the cloud customer) to upload a cloud consumer custom management information base (MIB) onto the cloud service provider hypervisor server 408 via a cloud service provider network management system integration layer 406. The cloud service provider network management system integration layer 406 is a customized unit of software that allows a cloud consumer custom MIB to be uploaded (via a portal or an API) to the cloud service provider hypervisor server 408, and to pass on SNMP traps from the private cloud 410, community cloud 412, and public cloud 414 directly to the cloud consumer 402.

The depicted cloud service provider portal 404 represents a portal that allows the cloud consumer 402 to upload custom MIBs, and/or to receive alerts (e.g., SNMP traps) from managed devices and/or applications in the managed clouds (i.e., private cloud 410, community cloud 412, and public cloud 414) at a SNMP trap receiver 416. An MIB is a database used to manage resources in a cloud or other network of resources. Information in the MIB is specific for managed resources in the cloud. The MIB contains object instances, which are identified by object identifiers (OIDs), which describe characteristics of the managed resources, such as their identity, their type (e.g., a server, a storage device, an application, etc.), etc., as well as current states (e.g., turned on or off, register values within the resource, workload queue levels, etc.).

The MIB is used by the cloud service provider hypervisor to manage the resources in the cloud, both by receiving information from the resources in the form of SNMP traps (which are received by a trap receiver within the cloud service provider hypervisor), and by transmitting instructions from the cloud service provider hypervisor to the resources (in the form of a GET/SET request). However, the MIB utilized by the cloud service provider hypervisor is provided by the cloud consumer 402, not the cloud service provider hypervisor. Thus, the present invention enables the cloud consumer 402 not only to customize the MIB, but also to directly deal with the MIB, thus circumventing, if not thwarting, most services provided by the cloud service provider hypervisor.

Alternatively, uploading and otherwise interacting with the cloud consumer custom MIB is performed though an application program interface (API) rather than a portal. That is, rather than using a portal (i.e., a web-based interface that allows a cloud customer (person) to direct the uploading and use of the MIB as described herein), an API is a software object that allows the hardware within the cloud consumer 402 to directly upload the cloud consumer custom MIB to the cloud service provider hypervisor server 408, and to thereafter seamlessly receive SNMP traps from the managed resources in the cloud system 400.

Figure 5:
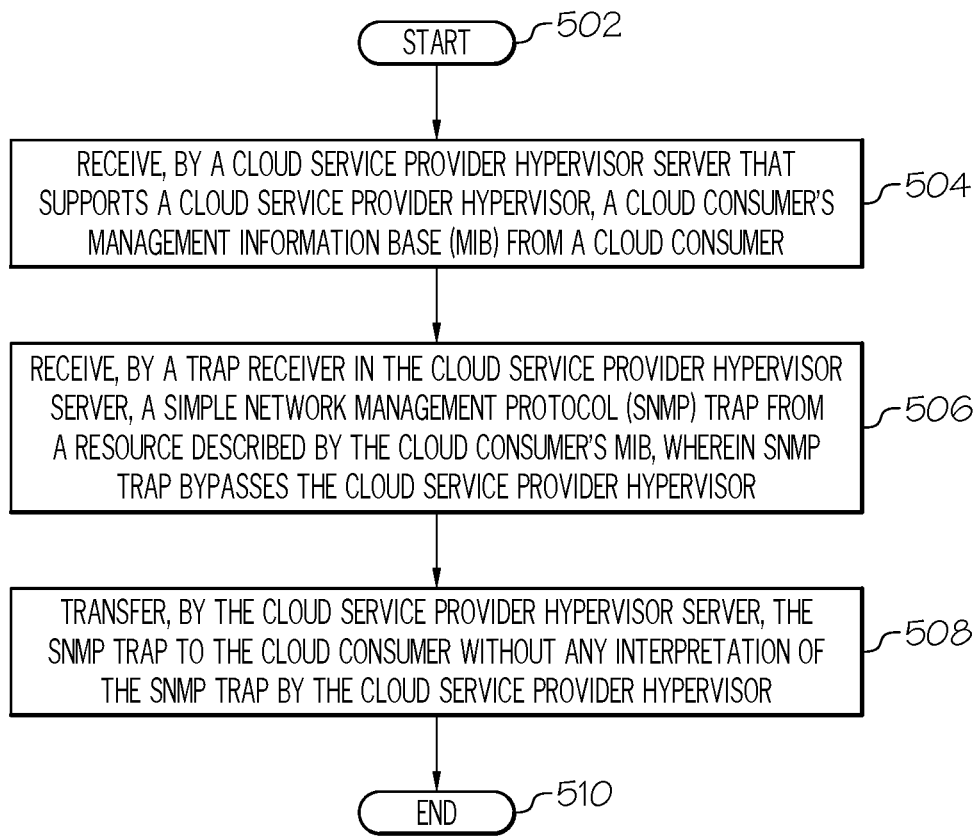
FIG. 5 is a high level flow-chart of one or more operations performed by one or more processors or other hardware devices to manage cloud resources by a cloud consumer and/or cloud customer.

With reference now to FIG. 5, a high level flow-chart of one or more operations performed by one or more processors and/or other hardware devices to manage cloud resources by a cloud consumer and/or cloud customer is presented.

After initiator block 502, a cloud service provider hypervisor server (e.g., cloud service provider hypervisor server 408 shown in FIG. 4) that supports a cloud service provider hypervisor receives a cloud consumer's management information base (MIB) from a cloud consumer (e.g., cloud consumer 402 shown in FIG. 4). The cloud consumer's MIB is a portable MIB that is capable of being loaded into multiple cloud service provider hypervisors, including different cloud service provider hypervisors operating within a same server (e.g., cloud service provider hypervisor server 408 shown in FIG. 4), or operating within different cloud service provider hypervisor servers (not depicted in FIG. 4).

The portability of the cloud consumer's MIB allows the cloud consumer, and/or the cloud customer using that cloud consumer, to use any cloud service provider hypervisor that is available and/or appropriate. Thus, the cloud consumer/ customer is not restricted to any particular cloud service provider hypervisor. Furthermore, by having the cloud consumer/customer provide its/his/her own MIB, the cloud consumer/customer retains control of how the cloud devices/ resources are configured, managed, operated, etc.

As described in block 506 of FIG. 5, a trap receiver (e.g., SNMP trap receiver 416 in FIG. 4) in the cloud service provider hypervisor server receives a Simple Network Management Protocol (SNMP) trap from a resource described by the cloud consumer's MIB. The SNMP trap is an SNMP message, from the resource, that describes an event in the resource, such as a change to a configuration of the resource, a new value in a register in the resource, a new work request in a work queue in the resource, a change in the on/off and/or online/offline state of the resource, etc.

As described in block 508 of FIG. 5, the cloud service provider hypervisor server transfers the SNMP trap directly to the cloud consumer without any interpretation of the SNMP trap by the cloud service provider hypervisor. That is, the cloud service provider network management system integration layer 406 shown in FIG. 4 interacts directly with the SNMP trap, thus bypassing the cloud service provider hypervisor, and therefore allowing the cloud consumer 402 to bypass (e.g., ignore) any MIB-related actions performed by the cloud service provider hypervisor. Thus, interpretation of monitoring information (e.g., from SNMP traps from the cloud resources) is left to the cloud consumer 402, thus relieving the cloud service provider hypervisor of needing to even understand the features and/or operations of the cloud resources. Rather, all management of the cloud resources is handled directly by the cloud consumer 402, thereby bypassing the cloud service provider hypervisor in such activities.

The flow chart terminates at block 510.

In an embodiment of the present invention, the cloud consumer's MIB, which is a custom MIB specific for a particular cloud consumer and/or cloud customer, is stored in the cloud service provider hypervisor server, thus allowing the cloud consumer's custom MIB to utilize the hardware and supporting software of the cloud service provider hypervisor server, while still bypassing management related functionality of the cloud service provider hypervisor.

In an embodiment of the present invention, the cloud consumer's MIB is subsequently removed from the cloud service provider hypervisor server. Removing the cloud consumer's MIB has multiple effects. First, the cloud consumer is no longer able to monitor the managed resources in the cloud system 400 shown in FIG. 4. Second, control of the managed resources in the cloud system 400 shown in FIG. 4 is now returned to the cloud service provider hypervisor. The cloud consumer 402 may still be able to utilize these managed resources, but without control of the MIB used by the cloud service provider hypervisor.

In an embodiment of the present invention, a hypervisor's MIB, which is stored in the cloud service provider hypervisor server, includes a copy of the cloud consumer's MIB, thus allowing the cloud service provider hypervisor to independently manage the resources described by the cloud consumer's MIB without directions from the cloud consumer. Thus, the cloud consumer/customer is able to customize the MIB used by the cloud service provider hypervisor, and then return control of the cloud system to the cloud service provider hypervisor to use the customized MIB (which in one embodiment is just the cloud consumer's custom MIB, and in another embodiment is a blend of the cloud consumer's custom MIB plus other MIB objects developed and/or discovered by the cloud service provider hypervisor).

In an embodiment of the present invention, the cloud consumer's (custom) MIB is generated by the cloud consumer, which is a collection of applications, APIs, and/or hardware computing devices.

In an embodiment of the present invention, an alert generator (e.g., the alert generator 420 shown in a managed resource 422 in the private cloud 410 in FIG. 4) generates an alert that describes information from the SNMP trap. For example, the alert may state that the managed resource 422 has failed, is free to take on new jobs, has been updated, etc. All such information would be reported in an SNMP trap, which is ultimately presented to the cloud consumer 402 in various embodiments of the present invention. In one or more embodiments, these SNMP traps are transmitted via a trap receiver (e.g., the SNMP trap receiver 416 shown in FIG. 4) in the cloud service provider hypervisor server 408, which then forwards the alert through the cloud service provider network management system integration layer 406 and the cloud service provider portal 404 (or an API) to the cloud consumer 402 (and/or the cloud customer). The alert may be sent via an e-mail message, a short message service (SMS) text message, or any other type of electronic communication to a hardware resource within the cloud consumer 402, such as a smart phone, a tablet computer, etc.

In an embodiment of the present invention, the SNMP trap messages that are sent to the cloud consumer 402 are stored in a log that is managed by the cloud consumer 402. This log contains a record of events that occur within cloud resources within the cloud system 400, thus allowing the cloud consumer 402 to create/modify new rules, reconfigure cloud resources, create and deploy corrective software patches, etc. to the cloud resources based on records found in the log of SNMP trap messages.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   receiving, by a cloud service provider hypervisor server that supports a cloud service provider hypervisor, a cloud consumer's management information base (MIB) via an application program interface, wherein the cloud consumer's MIB is a portable MIB that is capable of being loaded into multiple cloud service provider hypervisors, and wherein the application program interface is a software object that allows hardware within a cloud consumer to directly upload the cloud consumer's MIB to the cloud service provider hypervisor server;
   receiving, by a Simple Network Management Protocol (SNMP) trap receiver in the cloud service provider hypervisor server, an SNMP trap from a resource described by the cloud consumer's MIB, wherein the SNMP trap is an SNMP message that describes an event in the resource, wherein the SNMP trap is received from the resource via a cloud service provider network management system integration layer that is between the cloud consumer and the cloud service provider hypervisor in the cloud service provider hypervisor server, wherein the cloud service provider network management system integration layer bypasses the cloud service provider hypervisor in the cloud service provider hypervisor server and interacts directly with the SNMP trap, such that the cloud consumer bypasses any MIB-related actions performed by the cloud service provider hypervisor, and wherein all management of the resource is handled directly by the cloud consumer; and
   transferring, by the cloud service provider hypervisor server, the SNMP trap to the cloud consumer without any interpretation of the SNMP trap by the cloud service provider hypervisor, wherein the hardware within the cloud consumer reconfigures the resource based on the SNMP trap that is transferred by the cloud service provider hypervisor server to the cloud consumer.

2. The method of claim 1, further comprising:
   storing the cloud consumer's MIB in the cloud service provider hypervisor server.

3. The method of claim 2, further comprising:
   removing the cloud consumer's MIB from the cloud service provider hypervisor server, wherein said removing the cloud consumer's MIB disables the cloud consumer from monitoring the resource.

4. The method of claim 2, further comprising:
   storing a hypervisor's MIB in the cloud service provider hypervisor server, wherein the hypervisor's MIB comprises the cloud consumer's MIB in order to enable the cloud service provider hypervisor to independently manage the resource described by the cloud consumer's MIB without directions from the cloud consumer.

5. The method of claim 1, wherein the cloud consumer's MIB is generated by the cloud consumer.

6. The method of claim 5, wherein the cloud consumer is a set of one or more computing devices.

7. The method of claim 1, further comprising:
   generating, by an alert generator on the resource, an alert that describes information from the SNMP trap; and
   transmitting, via the trap receiver in the cloud service provider hypervisor server, the alert to the cloud consumer.

8. A computer program product for managing network resources, the computer program product comprising a computer readable storage medium having program code embodied therewith, wherein the computer readable storage medium is not a transitory signal per se, and wherein the program code is readable and executable by a processor to perform a method comprising:
   receiving, by a cloud service provider hypervisor server that supports a cloud service provider hypervisor, a cloud consumer's management information base (MIB) via an application program interface, wherein the cloud consumer's MIB is a portable MIB that is capable of being loaded into multiple cloud service provider hypervisors, and wherein the application program interface is a software object that allows hardware within a cloud consumer to directly upload the cloud consumer's MIB to the cloud service provider hypervisor server;
   receiving, by a Simple Network Management Protocol (SNMP) trap receiver in the cloud service provider hypervisor server, an SNMP trap from a resource described by the cloud consumer's MIB, wherein the SNMP trap is an SNMP message that describes an event in the resource, wherein the SNMP trap is received from the resource via a cloud service provider network management system integration layer that is between the cloud consumer and the cloud service provider hypervisor in the cloud service provider hypervisor server, wherein the cloud service provider network management system integration layer bypasses the cloud service provider hypervisor in the cloud service provider hypervisor server and interacts directly with the SNMP trap, such that the cloud consumer bypasses any MIB-related actions performed by the cloud service provider hypervisor, and wherein all management of the resource is handled directly by the cloud consumer; and transferring, by the cloud service provider hypervisor server, the SNMP trap to the cloud consumer without any interpretation of the SNMP trap by the cloud service provider hypervisor, wherein the hardware within the cloud consumer reconfigures the resource based on the SNMP trap that is transferred by the cloud service provider hypervisor server to the cloud consumer.

9. The computer program product of claim 8, wherein the method further comprises:

storing the cloud consumer's MIB in the cloud service provider hypervisor server.

10. The computer program product of claim 9, wherein the method further comprises:

removing the cloud consumer's MIB from the cloud service provider hypervisor server, wherein said removing the cloud consumer's MIB disables the cloud consumer from monitoring the resource.

11. The computer program product of claim 9, wherein the method further comprises:

storing a hypervisor's MIB in the cloud service provider hypervisor server, wherein the hypervisor's MIB comprises the cloud consumer's MIB in order to enable the cloud service provider hypervisor to independently manage the resource described by the cloud consumer's MIB without directions from the cloud consumer.

12. The computer program product of claim 8, wherein the cloud consumer's MIB is generated by the cloud consumer.

13. The computer program product of claim 12, wherein the cloud consumer is a set of one or more computing devices.

14. The computer program product of claim 8, wherein the method further comprises:

generating, by an alert generator on the resource, an alert that describes information from the SNMP trap; and transmitting, via the trap receiver in the cloud service provider hypervisor server, the alert to the cloud consumer.

15. A hardware device comprising:

a hardware processor, a computer readable memory, and a computer readable storage medium;

first program instructions to receive, by a cloud service provider hypervisor server that supports a cloud service provider hypervisor, a cloud consumer's management information base (MIB) via an application program interface, wherein the cloud consumer's MIB is a portable MIB that is capable of being loaded into multiple cloud service provider hypervisors, and wherein the application program interface is a software object that allows hardware within a cloud consumer to directly upload the cloud consumer's MIB to the cloud service provider hypervisor server;

second program instructions to receive, by a Simple Network Management Protocol (SNMP) trap receiver in the cloud service provider hypervisor server, an SNMP trap from a resource described by the cloud consumer's MIB, wherein the SNMP trap is an SNMP message that describes an event in the resource, wherein the SNMP trap is received from the resource via a cloud service provider network management system integration layer that is between the cloud consumer and the cloud service provider hypervisor in the cloud service provider hypervisor server, wherein the cloud service provider network management system integration layer bypasses the cloud service provider hypervisor in the cloud service provider hypervisor server and interacts directly with the SNMP trap, such that the cloud consumer bypasses any MIB-related actions performed by the cloud service provider hypervisor, and wherein all management of the resource is handled directly by the cloud consumer; and third program instructions to transfer, by the cloud service provider hypervisor server, the SNMP trap to the cloud consumer without any interpretation of the SNMP trap by the cloud service provider hypervisor, wherein the hardware within the cloud consumer reconfigures the resource based on the SNMP trap that is transferred by the cloud service provider hypervisor server to the cloud consumer; and wherein the first, second, and third program instructions are stored on the computer readable storage medium and executed by the processor via the computer readable memory.

16. The hardware device of claim 15, further comprising:

fourth program instructions to store the cloud consumer's MIB in the cloud service provider hypervisor server; and wherein the fourth program instructions are stored on the computer readable storage medium and executed by the processor via the computer readable memory.

17. The hardware device of claim 16, further comprising:

fifth program instructions to remove the cloud consumer's MIB from the cloud service provider hypervisor server, wherein said removing the cloud consumer's MIB disables the cloud consumer from monitoring the resource; and wherein the fifth program instructions are stored on the computer readable storage medium and executed by the processor via the computer readable memory.

18. The hardware device of claim 15, further comprising:

fourth program instructions to store a hypervisor's MIB in the cloud service provider hypervisor server, wherein the hypervisor's MIB comprises the cloud consumer's MIB in order to enable the cloud service provider hypervisor to independently manage the resource described by the cloud consumer's MIB without directions from the cloud consumer; and wherein the fourth program instructions are stored on the computer readable storage medium and executed by the processor via the computer readable memory.

19. The hardware device of claim 15, wherein the cloud consumer's MIB is generated by the cloud consumer.

20. The hardware device of claim 15, further comprising:

fourth program instructions to generate, by an alert generator on the resource, an alert that describes information from the SNMP trap; and fifth program instructions to transmit, via the trap receiver in the cloud service provider hypervisor server, the alert to the cloud consumer; and wherein the fourth and fifth program instructions are stored on the computer readable storage medium and executed by the processor via the computer readable memory.

\* \* \* \* \*